United States Patent [19]

Neil

[11] 4,398,786

[45] Aug. 16, 1983

[54] COLLIMATION LENS SYSTEM

[75] Inventor: Iain A. Neil, Glasgow, Scotland

[73] Assignee: Barr & Stroud Limited, Glasgow, Scotland

[21] Appl. No.: 245,335

[22] Filed: Mar. 19, 1981

[30] Foreign Application Priority Data

Apr. 26, 1980 [GB] United Kingdom ............... 8013848

[51] Int. Cl.³ .................. G02B 1/02; G02B 23/00; G02B 9/12; G02B 25/00
[52] U.S. Cl. ................... 350/1.4; 350/1.2; 350/566; 350/410; 350/474
[58] Field of Search ............ 350/1.2, 1.3, 1.4, 410, 350/474, 566, 565, 537, 453, 560, 570, 427, 562, 476, 478

[56] References Cited

U.S. PATENT DOCUMENTS

| | | | |
|---|---|---|---|
| 2,393,782 | 1/1946 | Kingslake et al. | 350/410 |
| 2,949,056 | 8/1960 | Loeck | 350/562 |
| 3,888,567 | 6/1975 | Shoemaker | 350/410 |
| 4,199,217 | 4/1980 | Rogers | 350/1.2 |

*Primary Examiner*—Jon W. Henry
*Attorney, Agent, or Firm*—Mason, Fenwick & Lawrence

[57] ABSTRACT

An eyepiece or collimation lens system (22) is formed by three optically-powered lens elements (A, B, C) aligned on a common optical axis (23) and arranged to accept radiation in the infrared wavelength region from a real image (I) and provide a bundle of parallel rays at an exit pupil (∅), each of the lens elements (A, B, C) is positively powered and made of a material which has a useful spectral bandpass in the infrared wavelength region and the refractive surface (6) of lens element (C) which lies adjacent the real image (I) is flat whereas the other refractive surfaces, (1, 2, 3, 4, 5) of the lens elements (A, B, C) are substantially spherical. A graticule may be mounted on or adjacent the flat refractive surface (6) and each refractive surface may be anti-reflection coated. Conveniently lens element (c) is made of zinc selenide whereas lens elements (A, B) are each made of germanium.

7 Claims, 1 Drawing Figure

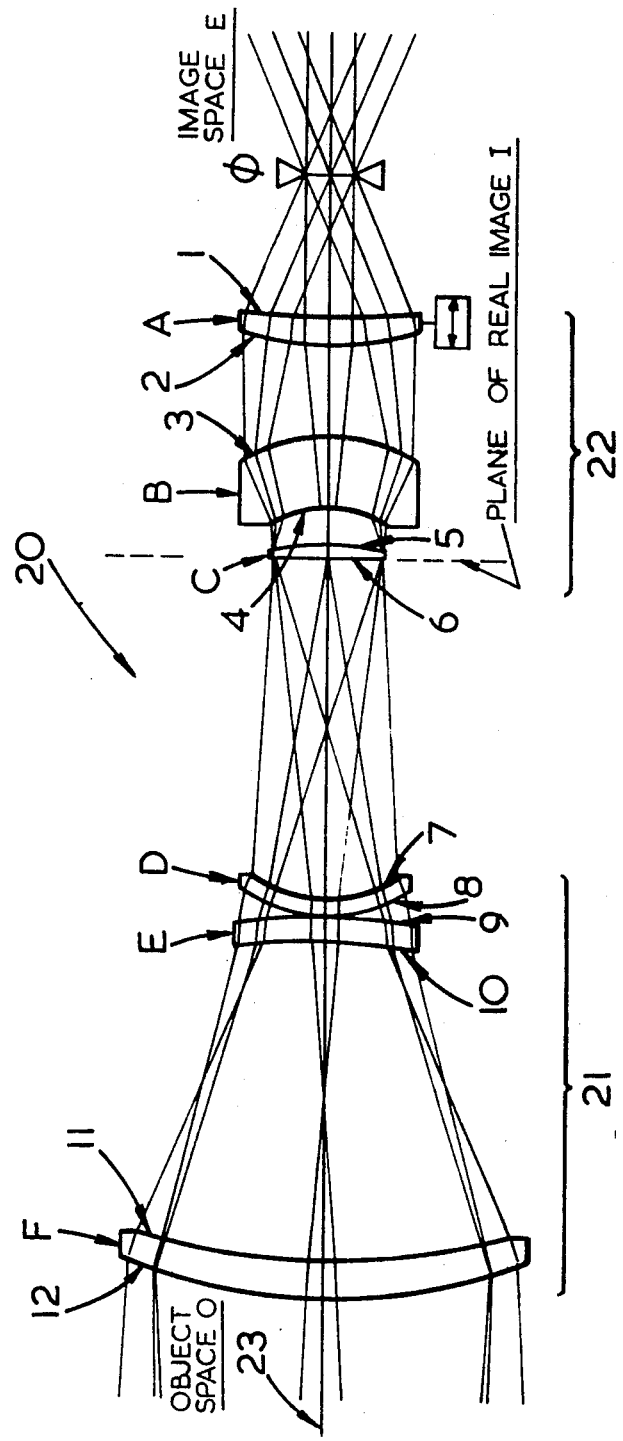

COLLIMATION LENS SYSTEM

This invention relates to an eyepiece or collimation lens system for use in a telescope or a microscope.

The arrival of high performance 'forward looking infrared systems' (commonly known by the acronym FLIR) has led to a demand for high performance afocal telescopes suitable for use with the FLIR system.

To achieve this a high performance eyepiece lens system and a high performance complimentary objective lens system are required. Various forms of such eyepiece lens systems have been previously proposed but the practical requirement for compactness (i.e. low f-number) has imposed a requirement for low field and pupil aberrations.

According to the present invention there is provided an eyepiece or collimation lens system formed by three optically-powered lens elements aligned on a common optical axis and arranged to accept radiation in the infrared wavelength region from a real image and to provide a bundle of parallel rays at an exit pupil, each said lens element being positively powered and made of a material which has a useful spectral bandpass in the infrared wavelength region, the refractive surface of the lens element adjacent said real image being flat and the five other refractive surfaces of said lens elements being substantially spherical.

Because the lens system of the present invention has only three lens elements the system is optically and mechanically simple; with five refractive surfaces substantially spherical and the other refractive surface being flat, the lens elements are easy to manufacture and the system can be arranged with the real image lying on the flat refractive surface which can be advantageous; and because the eyepiece system can be designed with low pupil aberrations and a near diffraction limited performance over the field, it can be attached to a suitable objective lens system to provide a compact high performance afocal telescope.

The lens element nearest the real image surface may be made of zinc selenide whereas each of the other two lens elements may be made of germanium (which has a V-value of 1182 and a refractive index of 4.003) all of which materials have a useful spectral bandpass in the 3-13 micron infrared wavelength region. Alternatively, the lens element nearest the real image may be made from one of the other materials recited in Table III all of which have bandpasses in the 3-13 micron region. However if the aforementioned lens element has the real image near to or on one of its surfaces it is important that the homogeneity quality of the material from which this lens element is composed, is good enough to ensure that high optical performance is achieved. All 3 lens elements may be fixedly mounted, the eyepiece system being insensitive to moderately large ambient temperature variations. However, any combination of one or two or three lens elements may be movable along the optical axis as a result of which the system can be compensated for large ambient temperature variations. Where it is desired to include a graticule in the system this may be supported by a plane-parallel plate (having zero optical power) and located at the real image of the system either in contact with or closely adjacent the lens element with the flat refractive surface. This simplifies centering of the graticule with respect to the lens elements of the system. Such a graticule could alternatively be supported by the flat surface of the lens element nearest the real image.

An embodiment of the present invention will now be described by way of example with reference to the accompanying schematic drawing and tables.

As is shown in the drawing a telescope 20 is formed by an objective system 21 and an eyepiece system 22 aligned on a common optical axis 23. The telescope 20 is of the afocal refractor type and internally forms a real image I of radiation entering the telescope from object space O. The objective system 21 is formed by a primary lens element F being positively powered, a secondary lens element E being negatively powered and a tertiary lens element D being negatively powered. Lens element E is colour corrective and when coupled to lens element D effects focussing and thermal compensation by movement along optical axis 23. The eyepiece system 22 is formed by positively powered lens elements A,B and C which form a fixed focus system as do elements D,E and F so that the objective system 21 accepts a bundle of parallel rays from an entrance pupil formed in the object space O and the eyepiece system 22 collects radiation from the inverted real image I formed by the objective system 21 and produces a bundle of parallel rays which form an exit pupil $\emptyset$ in image space E. The optical power of the various lens elements A, B,C,D,E,F and the spacing between the refractive surfaces 1-12 thereof are arranged such that the image I lies near surface 6 which is flat whereas all other refractive surfaces are substantially spherical i.e., if they are not truly spherical they are 'spherical' within the meaning of the art.

The telescope 20 is intended for use in the infrared wavelength region (i.e. 8-13 microns) and consequently the refractive indices of the lens elements are relatively large. In order to provide high optical performance at the internal real image I lens element C is preferably made of an optical material with low material homogeneities such as zinc selenide (CVD vacuum deposited) which has a refractive index of 2.41, lens elements A,B,D and F are made of a material which at 10 microns has a wavelength of at least 4, for example germanium the refractive index of which is 4.003, and lens element E is made of Barr and Stroud type 1 Chalcogenide glass, the refractive index of which is 2.49 (all measured at a temperature of 20° C. and at a wavelength of 10 microns). These materials (which are suited to being anti-reflection coated) also provide at least 60% transmission of incident radiation in the 8.5-11.5 micron range when anti-reflection coated. Thus all refractive surfaces within the telescope can be anti-reflection coated.

The eyepiece system 22 is moderately insensitive to focus changes resulting from the objective system 21 and optical performance degradation induced by ambient temperature changes typically within the range $-40°$ C.$-+70°$ C.

One example of the telescope 20 which includes the objective lens system 21 and the eyepiece lens system 22 is detailed in Table I wherein the radius of curvature of each refractive surface is given together with the aperture diameter of each surface and of the pupil $\emptyset$, the position of which is used as a datum from which the separation of successive refractive surfaces is defined, together with the nature of the material relevant to such separation interval. Thus for example surface 2 has a radius of curvature of $-117.35$ millimeters, the negative sign indicating that the centre of curvature is to the right hand side of surface 2; it is separated by a thickness of 8.05 millimeters of germanium from the preceding surface, No. 1, in the direction of the pupil ∅; it has an aperture diameter of 57.74 millimeters; and is separated from the succeeding surface, No. 3, by a distance 30.30 millimeters in air. This telescope produces a magnification of X7 and the eyepiece system 22 has an effective focal length of approximately 45.50 millimeters, and at the real image I an approximate f-number of 2.94.

The eyepiece system detailed in Table I is one of a family which can be constructed to provide in image space E a full field up to approximately 80° and a pupil diameter in excess of 15.5 mm. By scaling the eyepiece system by a factor in the range 0.01 to 10 an increase or decrease in the effective focal length may be obtained. The eyepiece system which has been described provides high performance over the majority of the field at the real image I as can be seen from Table II and with its low pupil aberrations it conveniently accepts an objective lens system 21 such as that described so as to provide a compact high performance afocal telescope. It will be noted that due to the radii of curvature of the eyepiece lens surfaces 1 and 3 the eyepiece system 22 when coated with a high transmission, low reflection coating, such as Barr & Stroud ARG3, can be combined with a FLIR system without introducing any noticable narcissus effect. Also, there is no vignetting at any of the refractive surfaces of the lens elements.

TABLE I

| Lens | Surface | Separation | Radius of Curvature | Material | Aperture Diameter |
|---|---|---|---|---|---|
| Entrance Pupil* | ∅ | 0 | Flat | Air | 15.50 |
| A | 1 | 46.63 | −254.02 | Air | 55.54 |
|   | 2 | 8.05 | −117.35 | Ge | 57.74 |
| B | 3 | 30.30 | 54.61 | Air | 56.12 |
|   | 4 | 22.91 | 38.10 | Ge | 38.23 |
| C | 5 | 12.92 | 113.54 | Air | 36.96 |
|   | 6 | 3.50 | Flat | ZnSe (CVD) | 36.56 |
| D | 7 | 113.02 | −42.57 | Air | 48.85 |
|   | 8 | 5.09 | −49.89 | Ge | 53.93 |
| E | 9 | 0.005 | 262.13 | Air | 57.93 |
|   | 10 | 7.39 | 201.68 | As/Se/Ge (BS1) | 58.11 |
| F | 11 | 104.36 | −228.09 | Air | 123.58 |
|   | 12 | 12.00 | −169.06 | Ge | 128.56 |

*Maximum field angle at entrance pupil = 46.3°.

TABLE II

| | At 20° C. | | | |
|---|---|---|---|---|
| | Approximate R.M.S. spot sizes (in microns) at the real image (I) referenced to pupil ∅ | | Approximate R.M.S. spot sizes (in milliradians) in object space O referenced to pupil ∅ | |
| Field | Monochromatic at 9.6 microns | *Chromatic over 8.5–11.5 microns | Monochromatic at 9.6 microns | *Chromatic over 8.5–11.5 microns |
| Axial | 36.8 | 39.5 | 0.073 | 0.105 |
| ⅓ | 39.6 | 41.6 | 0.084 | 0.127 |
| ⅔ | 46.0 | 48.3 | 0.122 | 0.159 |
| Full | 55.8 | 58.8 | 0.115 | 0.160 |

*Given as an equally weighted three wavelength accumulated measurement, the wavelengths being 8.5, 9.6 and 11.5 microns.

TABLE III

| Material | Refractive index* | V-value# |
|---|---|---|
| Ge | 4.003 | 1182 |
| BS2 | 2.856 | 248 |
| BSA | 2.779 | 209 |
| TI 1173 | 2.600 | 142 |
| AMTIR | 2.497 | 169 |
| BS1 | 2.492 | 152 |
| TI20 | 2.492 | 144 |
| ZnSe | 2.407 | 77 |
| KRS5 | 2.370 | 260 |
| KRS6 | 2.177 | 95 |
| AgCl | 1.980 | 72 |
| CsI | 1.739 | 316 |
| CsBr | 1.663 | 176 |
| KI | 1.620 | 137 |
| KBr | 1.526 | 82 |
| NaCl | 1.495 | 25 |
| KCl | 1.457 | 40 |

*The refractive index is for 10 microns
Over the wavelength range 8.5–11.5 microns

What is claimed is:

1. An eyepiece or collimation lens system formed by three optically-powered lens elements aligned on a common optical axis and arranged to accept radiation in the infrared wavelength region from a real image and to provide a bundle of parallel rays at an exit pupil, each said lens element being positively powered and made of a material which has a useful spectral bandpass in the infrared wavelength region, the refractive surface of the lens element adjacent said real image being flat and the five other refractive surfaces of said lens elements being substantially spherical.

2. A system as claimed in claim 1, including a graticule mounted on or adjacent said flat refractive surface.

3. A system as claimed in claim 1, wherein one or more of said refractive surfaces is anti-reflection coated.

4. A system as claimed in claim 1, wherein the two lens elements adjacent said exit pupil have refractive indices of not less than 4.0 at a wavelength of 10 microns and a temperature of 20° C.

5. A system as claimed in claim 1, wherein said lens element adjacent the real image is made of Zinc Selenide and the remaining lens elements of said system are made of Germanium.

6. A system as claimed in claim 1, wherein at least one of said lens elements is movable along the optical axis with respect to at least one other of said lens elements whereby the system can be compensated for large ambient temperature variations.

7. A system as claimed in claim 1, wherein the radius of curvature of each refractive surface is given together with the aperture diameter of each surface and of the exit pupil the position of which exit pupil is used as a datum from which the separation of successive refractive surfaces is defined, together with the nature of the material relevant to each such separation interval in the following table:

| Item | Surface | Separation | Radius of Curvature | Material | Aperture Diameter |
|---|---|---|---|---|---|
| Exit pupil | — | — | Flat | Air | 15.50 |
| 1st lens element | 1st surface | 46.63 | −254.02 | Air | 55.54 |
|  | 2nd surface | 8.05 | −117.35 | Ge | 57.74 |
| 2nd lens element | 1st surface | 30.30 | 54.61 | Air | 56.12 |
|  | 2nd surface | 22.91 | 38.10 | Ge | 38.23 |
| 3rd lens element | 1st surface | 12.92 | 113.54 | Air | 36.96 |
|  | 2nd surface | 3.50 | Flat | ZnSe | 36.56 | wherein numerical data is given in millimeters and negative radius of curvature denotes that the centre of curvature is on the exit pupil side of the surface whereas positive radius of curvature denotes that the centre of curvature is on the real image side of the surface.

* * * * *